United States Patent
Ashoff et al.

(10) Patent No.: US 8,253,338 B2
(45) Date of Patent: Aug. 28, 2012

(54) PROGRAMMABLE, PROGRESSIVE, DIRECTING LIGHTING SYSTEMS: APPARATUS AND METHOD

(75) Inventors: Richard d. Ashoff, Newport Beach, CA (US); James R. Zarian, Corona del Mar, CA (US)

(73) Assignee: Richard d. Ashoff, Newport Beach, CA (US)

( * ) Notice: Subject to any disclaimer, the term of this patent is extended or adjusted under 35 U.S.C. 154(b) by 152 days.

(21) Appl. No.: 12/864,420

(22) PCT Filed: Jan. 23, 2009

(86) PCT No.: PCT/US2009/031752
§ 371 (c)(1),
(2), (4) Date: Jul. 23, 2010

(87) PCT Pub. No.: WO2009/094494
PCT Pub. Date: Jul. 30, 2009

(65) Prior Publication Data
US 2010/0295483 A1 Nov. 25, 2010

Related U.S. Application Data

(60) Provisional application No. 61/006,586, filed on Jan. 23, 2008.

(51) Int. Cl.
*H01J 7/42* (2006.01)
*H05B 37/00* (2006.01)
(52) U.S. Cl. .................... 315/133; 315/323; 315/308
(58) Field of Classification Search .................. 315/291, 315/292, 307–309, 312–314, 323, 129–133
See application file for complete search history.

(56) References Cited

U.S. PATENT DOCUMENTS

| | | | |
|---|---|---|---|
| 4,347,499 A | 8/1982 | Burkman et al. |
| 4,737,764 A | 4/1988 | Harrison |
| 5,448,263 A | 9/1995 | Martin |
| 5,611,730 A | 3/1997 | Weiss |
| 5,962,992 A | 10/1999 | Huang et al. |
| 6,215,477 B1 | 4/2001 | Morrison et al. |
| 6,257,981 B1 | 7/2001 | Acres et al. |
| 6,388,399 B1 | 5/2002 | Eckel et al. |
| 6,577,080 B2 | 6/2003 | Lys et al. |
| 6,664,745 B2 | 12/2003 | Belliveau |
| 6,710,546 B2 | 3/2004 | Crenshaw |
| 6,747,636 B2 | 6/2004 | Martin |
| 6,754,602 B1 | 6/2004 | Tkachenko et al. |
| 6,832,958 B2 | 12/2004 | Acres et al. |
| 6,860,810 B2 | 3/2005 | Cannon et al. |
| 6,895,308 B2 | 5/2005 | Coogan |
| 6,954,197 B2 | 10/2005 | Morrison et al. |

(Continued)

FOREIGN PATENT DOCUMENTS

JP          05006500 A    1/1993

(Continued)

*Primary Examiner* — Don Le (57) ABSTRACT

Systems and methods for providing guidance and entertainment to people within a structure, through sequentially activated illuminating devices. In some embodiments, the illuminating devices receive instructions to illuminate the perimeter of a structure in a sequence that indicates the exit of the structure. In other embodiments, the illuminating devices receive instructions to illuminate a surface of a structure, such as a wall of a corridor, to track the movement of at least one object or person walking or otherwise moving in the structure. The instructions to the illuminating devices are sent from sensing and detecting devices or alternatively, from a command and control center, in response to changes detected in the environment of the structure.

21 Claims, 7 Drawing Sheets

U.S. PATENT DOCUMENTS

| | | |
|---|---|---|
| 6,972,401 B2 | 12/2005 | Akitt et al. |
| 7,184,030 B2 | 2/2007 | McCharles et al. |
| 7,277,018 B2 | 10/2007 | Reyes et al. |
| 7,289,113 B2 | 10/2007 | Martin |
| 7,342,513 B2 | 3/2008 | Meyer |
| 7,352,951 B2 | 4/2008 | Gotfried |
| 7,358,929 B2 | 4/2008 | Mueller et al. |
| 2004/0012565 A1 | 1/2004 | Cok |
| 2005/0202785 A1 | 9/2005 | Meyer |
| 2006/0109113 A1 | 5/2006 | Reyes et al. |
| 2007/0015506 A1 | 1/2007 | Hewett et al. |
| 2007/0029949 A1* | 2/2007 | Null et al. .................. 315/308 |
| 2007/0214046 A1 | 9/2007 | Falchuk et al. |
| 2008/0048851 A1 | 2/2008 | Reyes et al. |
| 2009/0001891 A1* | 1/2009 | Patterson .................. 315/129 |
| 2009/0129782 A1* | 5/2009 | Pederson .................. 398/135 |
| 2010/0026194 A1* | 2/2010 | Paton ........................ 315/152 |
| 2010/0127634 A1* | 5/2010 | Dowling et al. ............. 315/291 |
| 2010/0327766 A1* | 12/2010 | Recker et al. ............... 315/291 |

FOREIGN PATENT DOCUMENTS

| | | |
|---|---|---|
| JP | 2978416 B2 | 11/1999 |
| JP | 19-018773 A | 1/2007 |
| WO | WO0242809 A1 | 5/2002 |
| WO | WO2004074997 A2 | 9/2004 |

* cited by examiner

PROGRAMMABLE, PROGRESSIVE, DIRECTING LIGHTING SYSTEMS: APPARATUS AND METHOD

TECHNICAL FIELD

The present invention pertains to lighting systems. More particularly, the present invention relates to a single or plurality of sequential, sectional illuminating devices that illuminate according to instructions from a command and control center ("CCC") or a sensing or detecting device ("SDD").

BACKGROUND ART

The applicant regards the following background art to be useful for the understanding, searching, and examination of the present invention:

1. U.S. Pat. No. 4,347,499, issued Aug. 31, 1982 to Burkman et al.
2. U.S. Pat. No. 4,737,764, issued Apr. 12, 1988 to Harrison.
3. U.S. Pat. No. 5,448,263, issued Sep. 5, 1995 to Martin.
4. U.S. Pat. No. 5,611,730, issued Mar. 18, 1997 to Weiss.
5. U.S. Pat. No. 5,962,992, issued Oct. 5, 1999 to Huang et al.
6. U.S. Pat. No. 6,215,477 B1, issued Apr. 10, 2001 to Morrison et al.
7. U.S. Pat. No. 6,257,981 B1, issued Jul. 10, 2001 to Acres et al.
8. U.S. Pat. No. 6,388,399 B1, issued May 14, 2002 to Eckel et al.
9. U.S. Pat. No. 6,577,080 B2, issued Jun. 10, 2008 to Lys et al.
10. U.S. Pat. No. 6,664,745 B2, issued Dec. 16, 2003 to Belliveau.
11. U.S. Pat. No. 6,710,546 B2, issued Mar. 23, 2004 to Crenshaw.
12. U.S. Pat. No. 6,747,636 B2, issued Jun. 8, 2004 to Martin.
13. U.S. Pat. No. 6,754,602 B1, issued Jun. 22, 2004 to Tkachenko et al.
14. U.S. Pat. No. 6,832,958 B2, issued Dec. 21, 2004 to Acres et al.
15. U.S. Pat. No. 6,860,810 B2, issued Mar. 1, 2005 to Cannon et al.
16. U.S. Pat. No. 6,895,308 B2, issued May 17, 2005 to Coogan.
17. U.S. Pat. No. 6,954,197 B2, issued Oct. 11, 2005 to Morrison et al.
18. U.S. Pat. No. 6,972,401 B2, issued Dec. 6, 2005 to Akitt, et al.
19. U.S. Pat. No. 7,277,018 B2, issued Oct. 2, 2007 to Reyes et al.
20. U.S. Pat. No. 7,342,513 B2, issued Mar. 11, 2008 to Meyer.
21. U.S. Pat. No. 7,358,929 B2, issued Apr. 15, 2008 to Mueller et al.
22. U.S. Pat. No. 7,352,951 B2, issued Apr. 1, 2008 to Gotfried.
23. U.S. Pat. No. 7,184,030 B2, issued Feb. 27, 2007 to McCharles et al.
24. U.S. Pat. No. 7,289,113 B2, issued Oct. 30, 2007 to Martin.
25. U.S. Patent Application Publication 2004/0012565 A1, published Jan. 22, 2004 to Cok.
26. U.S. Patent Application Publication 2005/0202785 A1, published Sep. 15, 2005 to Meyer
27. U.S. Patent Application Publication 2006/0109113 A1, published May 25, 2006 to Reyes et al.
28. U.S. Patent Application Publication 2007/0015506 A1, published Jan. 18, 2007 to Hewett et al.
29. U.S. Patent Application Publication 2007/0214046 A1, published Sep. 13, 2007 to Falchuk et al.
30. U.S. Patent Application Publication 2008/0048851 A1, published Feb. 28, 2008 to Reyes et al.
31. WIPO Publication WO0242809A1, published May 30, 2002 to Lowry.
32. WIPO Publication WO04074997A2, published Sep. 2, 2004 to Hoch et al.

DISCLOSURE OF INVENTION

The present invention involves systems and methods for providing guidance to people within a structure, through sequentially activated illuminating devices, and for providing an entertaining and decorative lighting effect in a building.

The invention comprises two and, in some embodiments, three types of components. In embodiments where all of the components are not directly connected (i.e. by being integrated together on a printed circuit board or connected through electrical hookup wire), the components are in communication via a network. The network can be either wired or wireless. Messages, including instructions and notifications, sent and received between the various components may be sent via TCP/IP, UDP, DMX512, or any other protocol known to those skilled in the art.

One of the three types of components alluded to above is a sensing or detecting device ("SDD"). An SDD contains one or more sensors for detecting changes in its environment. The sensors of an SDD are any of those commonly known and available for detecting one or more of the following changes in the environment: movement, a change in temperature, a change in pressure, and the presence of smoke or toxic gasses above a predefined concentration. Additionally, in some embodiments an SDD includes a network adapter that is directly connected through a USB port, serial port, Firewire port, PCMCIA slot, PCI slot, or similar connection; or electrical hookup wiring; or is permanently integrated with the hardware of the sensor on a printed circuit board ("PCB"). Upon an environmental condition passing a given threshold for a type of sensor in an SDD, the SDD, through the network adapter or a direct connection, transmits a notification indicating the occurrence of the detected change in the environment to a command and control center ("CCC"), to be explained in further detail below. In an alternate embodiment, an SDD responds to the occurrence of a change in the environment by sending instructions to at least one illuminating device ("ID").

A second component of the system, alluded to above, is the CCC. In preferred embodiments, the CCC is a general purpose computer, having at least a memory, a central processing unit for carrying out instructions contained in the memory, and special instructions in the memory for processing notifications received from at least one SDD and issuing appropriate commands to at least one ID. Further, in the preferred embodiments of the CCC, the general purpose computer is attached to a special-purpose auxiliary board adapted to interface with SDDs and IDs, either directly or through a network. The special-purpose auxiliary board may be connected to the general purpose computer via USB port, serial port, Firewire port, PCMCIA slot, PCI slot, or similar connection, or electrical hookup wiring. In embodiments where the CCC communicates through the auxiliary board with SDDs and IDs via a network, a network adapter is connected to the auxiliary board in the same manner that it is connected to an SDD, as disclosed above. In other embodiments, the above-discussed components of the CCC are directly connected, and the general purpose computer is instead more specialized hardware, such as a microcontroller or FPGA. In some embodiments of the CCC, the CCC contains in its memory a map of the structure in which the SDDs and IDs are located. As discussed above, the CCC is not present in some embodiments of the system and, in those embodiments, the SDD instead performs the logic, either with a central processing unit and a memory with processor-executable instructions, or hardwired logic (i.e. digital logic gates and/or analog circuitry) that the CCC would otherwise handle, using the same range of hardware.

A third component on the network is an illuminating device (again, "ID"). The illuminating device is a tile or panel containing one or more light sources behind a translucent or transparent surface. Preferred embodiments employ "edge-lighting." In such embodiments, at least one light-emitting diode ("LED"), organic light-emitting diode ("OLED"), or light-emitting capacitor ("LEC") or other light source is located substantially parallel to an edge of a substrate located in the cavity of a tray comprising a floor and a plurality of walls coupled to the perimeter of the floor. The substrate receives and guides light from the light sources. The aforestated translucent or transparent surface is located opposite the floor and forms a ceiling to the tray. In some embodiments, the ceiling has edges coupled to its perimeter, extending toward the tray. In other embodiments, at least one wall is translucent or transparent in order to allow light from an adjacent illuminating device to enter into the tray. Additionally, in some embodiments, at least one of the edges of the ceiling is transparent or translucent, in order to allow light from an adjacent illuminating device to enter. More specific and alternate embodiments of IDs are disclosed in International Patent Application No. PCT/US08/82675, which claims priority to U.S. Provisional Patent Application No. 60/996,221, both of which are incorporated herein by reference. An ID is adapted to be mounted on or in a wall, floor, ceiling or any other surface of a structure. For receiving commands via a network, an ID utilizes a network adapter, connected as discussed with reference to the other components of the system, and it is preferred that the network adapter be integrated in the ID on a printed circuit board. In other embodiments, an ID is directly connected with an SDD and/or CCC.

The power source for the ID, SDD and CCC can be high or low voltage AC, although low voltage is preferred. Alternatively, the power source may be high or low voltage DC, with low voltage DC being preferred. The circuitry can be "hardwired" to a power source or use batteries to operate. It would be understood by those skilled in the art that provisions can be made to allow the circuitry to switch from AC, hard-wired electricity, to battery-operated DC. Further, the battery can be integrated into the above-discussed components of the system and can be rechargeable.

In one method, the system detects movement of a person within a room through an SDD, the SDD sends an electronic notification to the CCC indicating that movement is occurring in the room, and the CCC responds by sending electronic instructions to multiple IDs in the room to light up the perimeter of the room in a sequence that directs the person toward the exit of the room.

In another method, the system detects movement of a person walking in a hallway and provides decorative illumination representing the position and direction that the person is moving in. First, an SDD would detect the movement of the person and send a notification to the CCC. The CCC, in turn, would instruct an ID closest to the person, a plurality of IDs immediately in front of the person, and a plurality of IDs immediately behind the person to light up. The CCC simultaneously instructs other IDs in the immediate vicinity to not light up. When repeated in a continuous loop, the illumination from the IDs appears to track the movement of the person.

Embodiments of the ID, SDD, and CCC may be installed using appropriate fasteners for concrete, drywall, wood panels, for baseboards, chair rails, crown moldings and the like. It would be understood by those having ordinary skill in the art that the components of this system and method could be used in emergency evacuations and non-emergency situations in office complexes, multi-level parking structures, public libraries, hospitals, nursing homes, hotels, superstores, shopping malls, passenger liners, oil-rig platforms, courtyards, casinos, and other venues.

In one aspect, the present invention provides a progressive, directing lighting system comprising:

a plurality of sensing or detecting devices each comprising at least one sensor for detecting a change in environmental conditions selected from the group consisting of movement of at least one object or person, a change in temperature, a change in pressure, a presence of smoke above a predefined concentration, and a presence of toxic gas above a predefined concentration;

a plurality of illuminating devices comprising a tile with a transparent or translucent surface and at least one light source located substantially parallel to an edge of a light-guiding substrate located behind the surface;

wherein the illuminating devices are illuminated according to environmental conditions detected by the sensing or detecting devices;

wherein the sensing or detecting devices and the illuminating devices are directly connected or are connected to the same wired or wireless network; and wherein the sensing or detecting device contains either hardwired logic or a processing unit and a memory with processor executable instructions for detecting a change in environmental conditions selected from the group consisting of movement of at least one object or person, a change in temperature, a change in pressure, a presence of smoke above a predefined concentration, and a presence of toxic gas above a predefined concentration; and in response to detecting the change in environmental conditions, instructing the plurality of illuminating devices to illuminate in a sequence that both illuminates the perimeter of a structure having an exit and indicates the location of the exit.

In a further aspect, the present invention provides a system as above, wherein the illuminating devices are located in the floor of the structure.

In a further aspect, the present invention provides a system as above, wherein at least one sensing or detecting device is located behind the translucent or transparent surface of the tile of an illuminating device.

In a further aspect, the present invention provides a system as above, wherein the illuminating devices and sensing or detecting devices are powered by alternating current.

In a further aspect, the present invention provides a system as above, wherein the illuminating devices and sensing or detecting devices are powered by direct current.

In another aspect, the present invention provides a progressive, directing lighting system comprising:

a plurality of sensing or detecting devices each comprising at least one sensor for detecting a change in environmental conditions selected from the group consisting of movement of at least one object or person, a change in temperature, a change in pressure, a presence of smoke above a predefined concentration, and a presence of toxic gas above a predefined concentration;

a plurality of illuminating devices comprising a tile with a transparent or translucent surface and at least one light source located substantially parallel to an edge of a light-guiding substrate located behind the surface;

a command and control center comprising either a) a general purpose computer, having a central processing unit and a memory, connected to an auxiliary board adapted to interface with the sensing or detecting devices and the illuminating devices or b) an FPGA or microcontroller having, integrated with, or connected to hardware adapted to interface with the sensing or detecting devices and the illuminating devices;

wherein the command and control center is programmed to analyze notifications relating to changes in environmental conditions received from sensing or detecting devices and to issue instructions to sensing or detecting devices and illuminating devices in response to the received notifications;

wherein the sensing or detecting devices, illuminating devices, and command and control center are directly connected or are connected to the same wired or wireless network;

wherein the command and control center is programmed for receiving a notification from a sensing or detecting device indicating a change in environmental conditions selected from the group consisting of movement of at least one object or person, a change in temperature, a change in pressure, a presence of smoke above a predefined concentration, and a presence of toxic gas above a predefined concentration; and in response to the notification of a detected the change in environmental conditions, instructing the plurality of illuminating devices to illuminate in a sequence that both illuminates the perimeter of a structure having an exit and indicates the location of the exit.

In a further aspect, the present invention provides a system as above, wherein the command and control center is a general purpose computer, having a central processing unit and a memory, connected to an auxiliary board adapted to interface with the sensing or detecting devices and the illuminating devices, and contains within the memory processor-executable instructions for:

receiving an electronic notification from a sensing or detecting device that motion is detected in a room of a structure; and sending a notification of the movement to a display screen that is either directly connected to the command and control center or that is in communication with the command and control center through another computer on a wired or wireless network.

In a further aspect, the present invention provides a system as above, wherein the command and control center is a general purpose computer, having a central processing unit and a memory, connected to an auxiliary board adapted to interface with the sensing or detecting devices and the illuminating devices, and contains within the memory a map of the structure in which the sensing or detecting devices and the illuminating devices are located.

In a further aspect, the present invention provides a system as above, wherein the command and control center, illuminating devices, and sensing or detecting devices are powered by alternating current.

In a further aspect, the present invention provides a system as above, wherein the command and control center, illuminating devices, and sensing or detecting devices are powered by direct current.

In another aspect, the present invention provides a method of providing progressive, directing lighting for a structure comprising:

receiving a notification of a change in environmental conditions within the structure detected by at least one sensor in a sensing or detecting device for detecting a change in environmental conditions selected from the group consisting of movement of at least one object or person, a change in temperature, a change in pressure, a presence of smoke above a predefined concentration, and a presence of toxic gas above a predefined concentration;

sending electronic instructions to a plurality of illuminating devices mounted along the perimeter of a structure to illuminate in a sequence that both illuminates the perimeter of the structure and indicates the location of an exit of the structure, wherein the sequence begins with illuminating the illuminating device furthest from the exit and progresses to the illuminating device closest to the exit.

In a further aspect, the present invention provides a method as above, further comprising:

sending electronic instructions to at least one sensing or detecting device to deactivate motion-sensing functionality;

sending electronic instructions to at least one illuminating device to not illuminate in colors that are not associated with an emergency; and sending electronic instructions to at least one illuminating device to illuminate in colors associated with an emergency.

In a further aspect, the present invention provides a method as above, wherein the sequence includes instructing all of the illuminating devices illuminated as a result of the sequence to no longer illuminate after a predetermined period of time has elapsed. In an even further aspect, the sequence in the method above repeats from the beginning after a predetermined period of time has elapsed.

In a further aspect, the present invention provides a method of providing a decorative illumination along a surface of a structure comprising:

a) receiving a notification of movement of at least one object or person within the structure, detected by at least one motion sensor in a sensing or detecting device;

b) sending electronic instructions to a plurality of illuminating devices mounted in an array along at least a portion of the surface of the structure to illuminate or not in a sequence that tracks the movement of the at least one object or person, wherein the sequence comprises:

b1) instructing three to five consecutive illuminating devices immediately in front of the illuminating device closest to the at least one object or person to illuminate;

b2) simultaneously instructing three to five consecutive illuminating devices immediately behind the illuminating device closest to the at least one object or person to illuminate; and b3) simultaneously instructing illuminating devices further in front of and behind the illuminating device closest to the at least one object or person to not illuminate; and c) repeating steps a and b.

In a further aspect, the above method includes in step b) the step of simultaneously instructing the illuminating device closest to the at least one object or person to illuminate. In another aspect, the above method includes in step b) the step of simultaneously instructing the illuminating device closest to the at least one object or person to not illuminate.

In a further aspect, steps b1) and b2) of the above method are:

b1) instructing three consecutive illuminating devices immediately in front the illuminating device closest to the at least one object or person to illuminate;

b2) simultaneously instructing three consecutive illuminating devices immediately behind the illuminating device closest to the at least one object or person to illuminate.

These and other aspects of the present invention will become readily apparent from the following detailed description taken in conjunction with the accompanying drawings.

MODES FOR CARRYING OUT THE INVENTION

Figure 1:
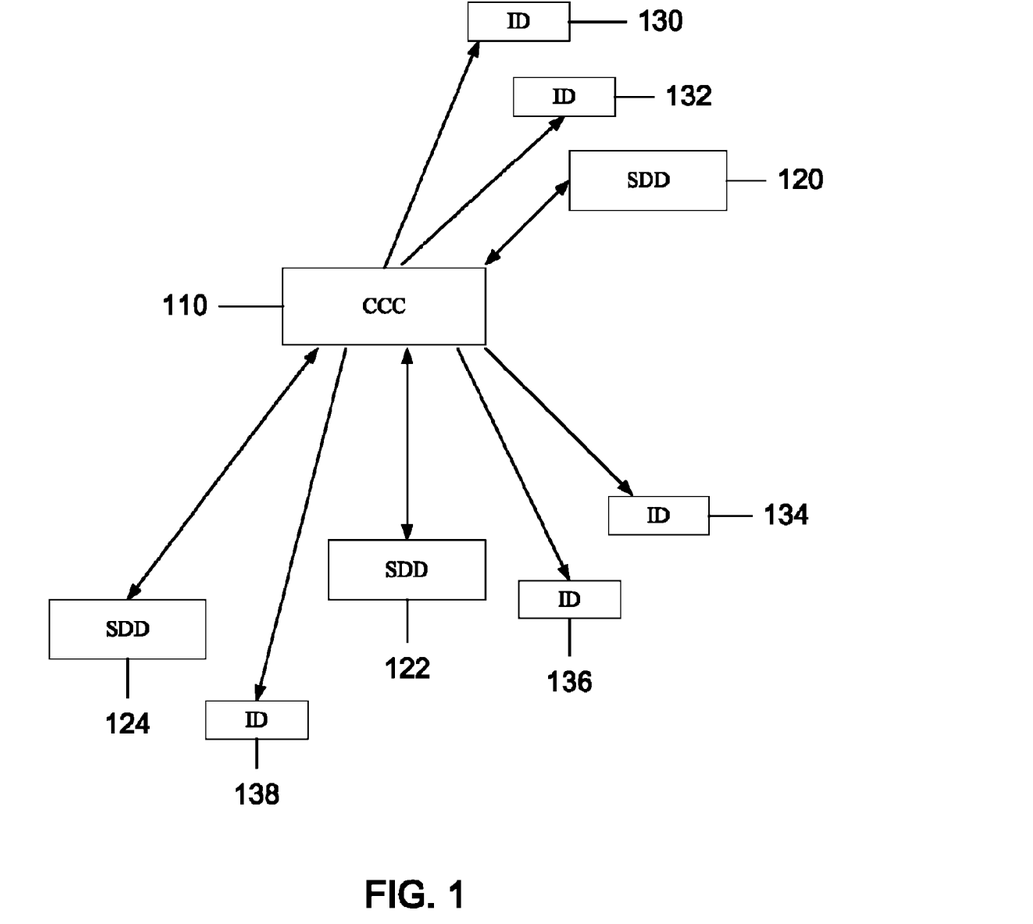
FIG. 1 is a diagram of the directionality of communication between a CCC, a plurality of SDDs and a plurality of IDs.

FIG. 1 is a diagram of the directionality of communication between a CCC 110, a plurality of SDDs (120 through 124) and a plurality of IDs (130 through 138). Upon detecting the occurrence of an event that a particular SDD, say SDD 120, is designed to detect, the SDD sends a notification to CCC 110 indicating the type of event detected and an identification code for itself, which in this example is "120". For this discussion, SDD 124 is capable of detecting only one event. In notifications that it sends to CCC 110, the code indicating the type of event is absent, and the mere fact that SDD 124 is communicating an identification code is enough to inform CCC 110 of the type of event occurring. This is because CCC 110 contains, in its memory, a look up table for correlating SDD 124 with the type of event it is capable of detecting.

For this discussion, SDD 124 is sensitive to heat, for detecting fire. SDD 124 would send a notification to CCC 110 if the temperature in the environment of SDD 124 rose above 120 degrees Fahrenheit, or some other predetermined threshold. An SDD that detects changes in pressure, say SDD 120, would send a notification to CCC 110 if SDD 120 detected a change in pressure of the magnitude and suddenness characteristic of an explosion. An SDD that detects movement, which in this case is also SDD 120, would send a notification to CCC 110 if a beam of visible or infrared light was interrupted, or if images of the environment taken at consecutive moments in time contained enough differences to indicate motion of at least one object or person in the environment of SDD 120. For purposes of this description, SDD 122 is able to detect smoke or other toxic gas in a concentration known to be unsafe. SDD 122 would send a notification to CCC 110 if it detected smoke or toxic gas above a predefined concentration.

In other embodiments, an SDD need not send an identification code for itself because it communicates with a CCC through a specific hardware or software port assigned exclusively to it, thus providing the CCC with enough information to identify which SDD is sending the notification. Thus, it is to be understood that a communication from an SDD could be as simple as a "1" or a voltage increase above a certain threshold, to indicate the occurrence of a detected event. A CCC may contain in its memory a map of the facility in which the associated SDDs and IDs are located or it may contain a lookup table or similar data structure for associating a particular SDD with one or more IDs.

Referring specifically to FIG. 1 again, the arrows indicating the flow of data indicate that it is possible for CCC 110 to send instructions to SDDs 120, 122, and 124. Thus, CCC 110 may instruct one or more of SDDs 120, 122, and 124 to activate or deactivate certain sensing capabilities, such as motion detection. The purpose of this is discussed in more detail with reference to FIG. 2.

Depending on the type of environmental condition detected by one of SDDs 120 through 124, CCC 110 issues corresponding instructions to the appropriate IDs, 130 through 138, in the building. In its most basic embodiment, each command is simply an instruction to turn on or off, such as a 1 or 0, or an increase or decrease in voltage. Thus, if IDs 134 and 136 were capable of only illuminating in green and red, respectively, then the CCC 110, upon receiving a notification from SDD 122 of smoke and knowing that IDs 134 and 136 are near SDD 122, would send an instruction to ID 134 to turn off and ID 136 to turn on. However, an ID may contain light sources of multiple colors. For the purposes of this description, ID 138 is capable of illuminating in green or red. ID 138 is in the vicinity of SDD 124. If SDD 124 sent a notification to CCC 110 indicating a fire condition in its environment, CCC 110 would determine that ID 138 is in the vicinity, and would send an instruction to ID 138 containing a code for the color red. The code for each illumination instruction may be a number, such as 2 for red, 1 for green, and 0 for no illumination. It would be understood by those having ordinary skill in the art that other coding schemes could be used instead, and that such variations are still within the scope of the present invention.

Figure 2:
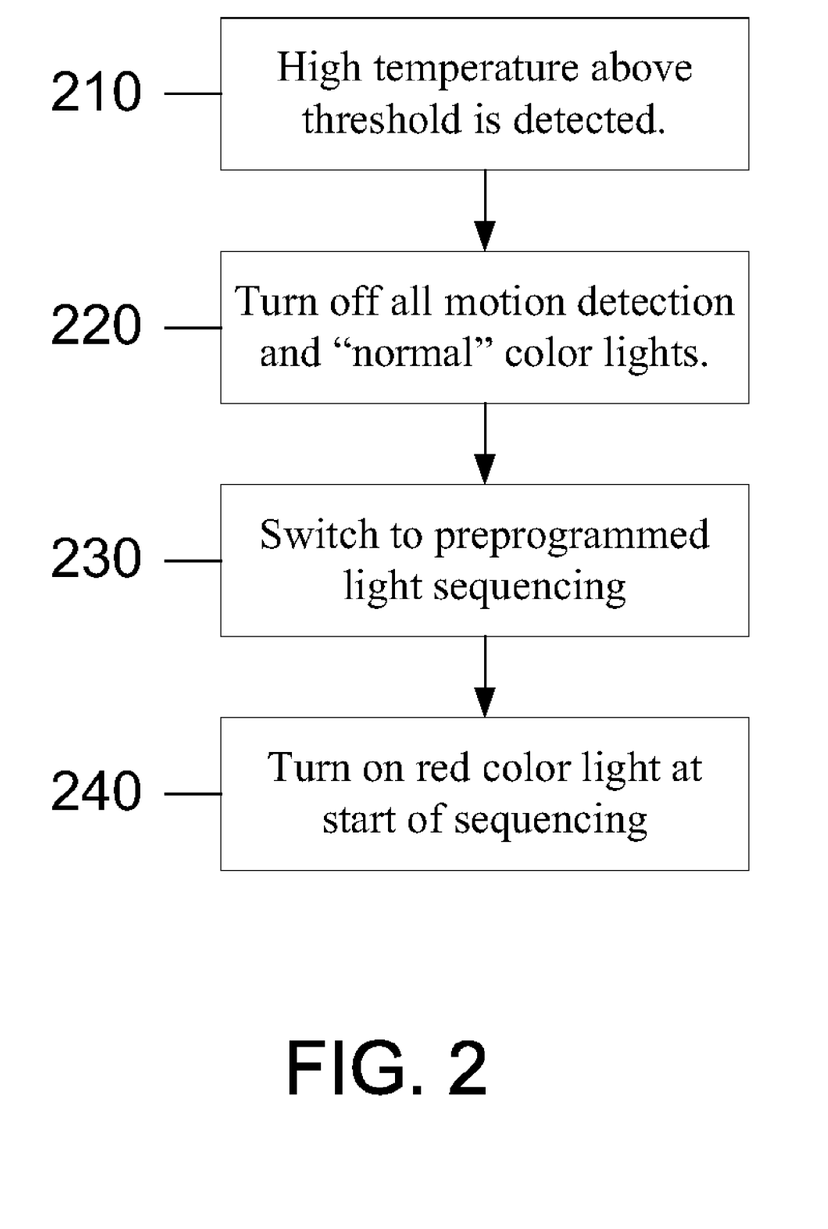
FIG. 2 is a flowchart showing the steps carried out by a system of the present invention for detecting a fire and responding with appropriate instructions to IDs.

FIG. 2 is a flowchart showing the steps carried out by a system of the present invention for detecting a fire and responding with appropriate instructions to IDs. In step 210, an SDD detects that the temperature in the surrounding area has passed a certain threshold, say 120 degrees Fahrenheit. In step 220, the SDD sends a signal indicating this condition to a CCC, which in turn determines that motion detecting functionality in the SDDs and all IDs displaying a normal color that is not associated with an emergency should be turned off. Accordingly, these instructions are distributed to the appropriate devices. The motion detection functionality of an SDD is used for entertaining and decorative purposes in many embodiments, as explained in reference to FIG. 5. Thus, because the illumination patterns needed for the decorative effect may interfere with the patterns that should be displayed for the fire condition, it is prudent to turn off the components and functionality associated with the decorative lighting. In step 230, the system initiates a preprogrammed sequence for illuminating IDs to outline the periphery of a room in a way that indicates the location of the room's exit. Such a sequence is discussed in further detail with reference to FIG. 3. In step 240, IDs are instructed to illuminate in red to indicate the emergency.

Figure 3:
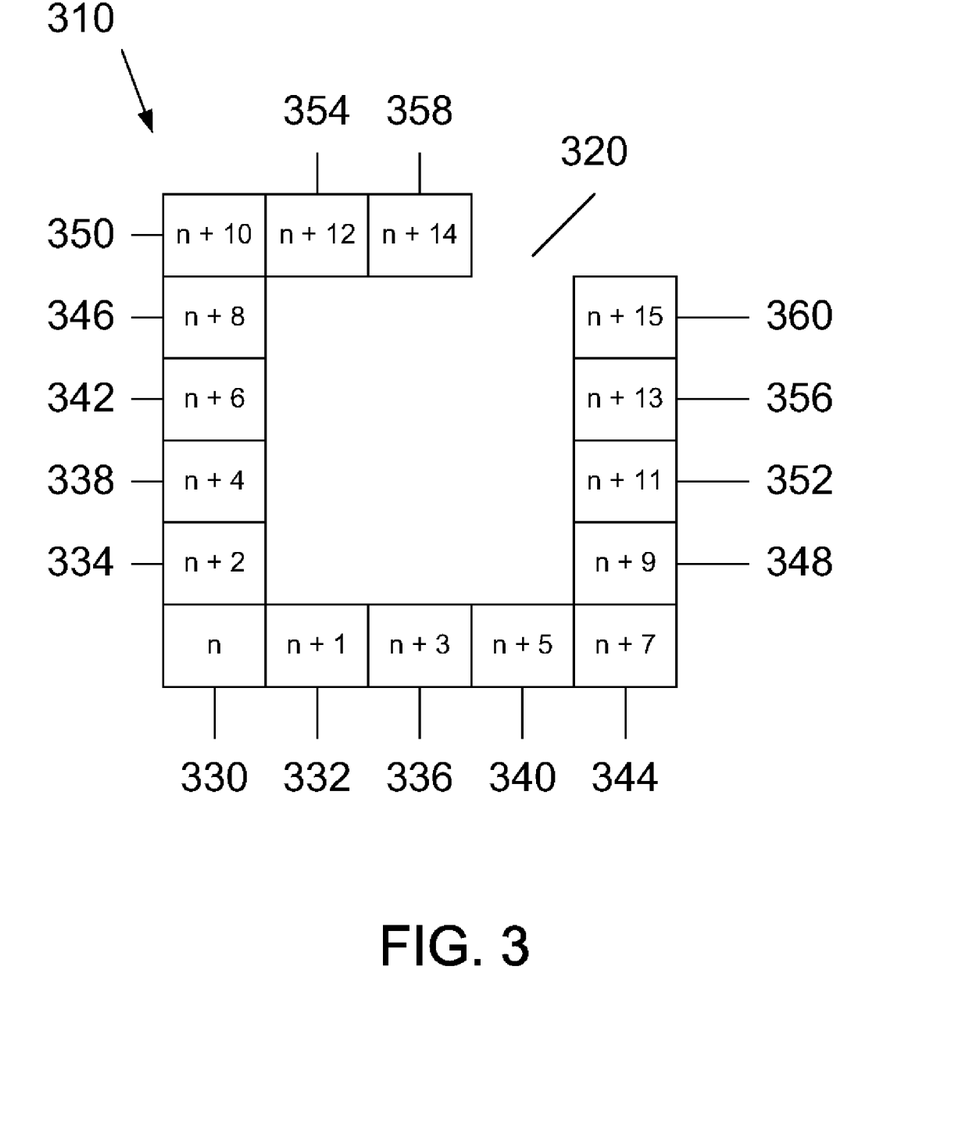
FIG. 3 is a diagram showing how the periphery of a room would be illuminated by IDs to indicate the location of the room's exit.

FIG. 3 is a diagram showing how the periphery of a room 310 would be illuminated by IDs 330 through 360 to indicate the location of exit 320. In this diagram, sixteen IDs, 330 through 360, are embedded in the floor of room 310, around the periphery. Starting from ID 330 and ending with ID 360, which for purposes of the sequence will be referred to as "n" and "n+15" respectively, the IDs are illuminated one by one from n to n+15. Under this sequence, the resulting lighting pattern appears to indicate the location of and general direction towards exit 320. Within the scope of the present invention are variations on this sequence, such as turning off the preceding ID when the next ID in the sequence is turned on, leaving the preceding IDs illuminated when the next ID in the sequence is turned on, and/or turning all of the IDs off after a number of seconds have passed and repeating the sequence in a loop. An illumination sequence such as the one shown here would be activated by the system upon the detection of a fire to help people escape the room or structure. An illumination sequence such as this would also be used in a nursing home, hospital, or similar setting in which a confused patient might emerge from bed and be unable to exit the room without guidance. Under this scenario, an SDD (not shown) in the room would detect the motion of the patient and send a notification to a CCC (not shown), which would activate IDs 330 through 360, in the correct pattern, or alternatively, the SDD might control the activation of the IDs directly, as discussed with reference to FIG. 4.

It is also contemplated that, in certain embodiments, the fact that a patient is moving around in a room would be indicated on a display screen to notify healthcare personnel. The display screen bearing the notification could be directly connected to the CCC or could be in communication with the CCC via another computer on a wired or wireless network. It is preferable that the CCC be a general purpose computer so that a variety of off-the-shelf software programs, such as GoToMyPC or Microsoft Terminal Services would be available for providing this functionality.

Figure 4:
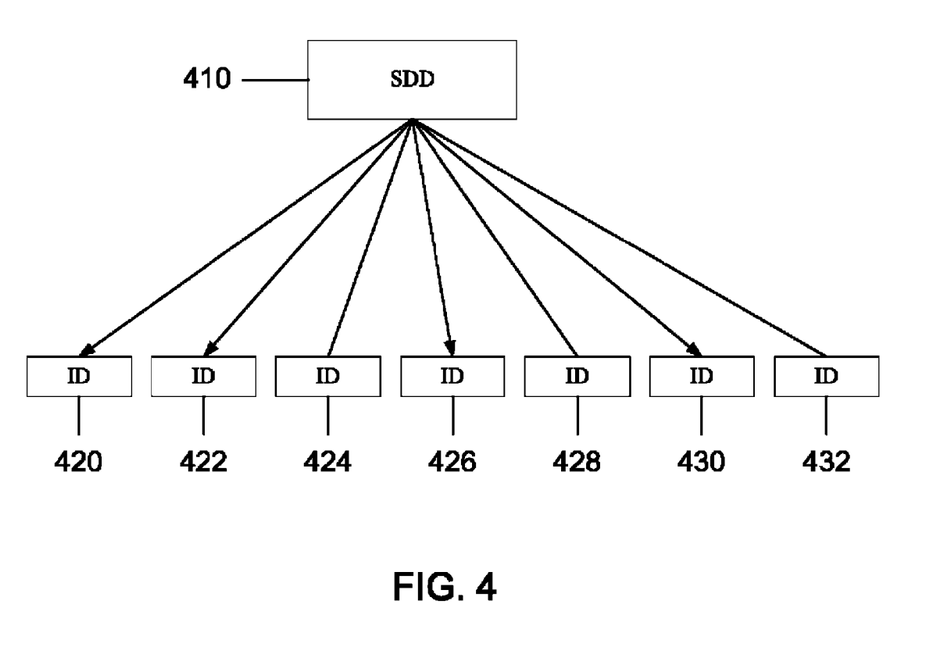
FIG. 4 is a diagram of the directionality of communication in a system where no CCC is present.

FIG. 4 is a diagram of the directionality of communication in a system where no CCC is present. Here, SDD 410 is in one-way communication with IDs 420 through 432. In this configuration, SDD 410 may directly send instructions to each of IDs 420 through 432. The discussion in relation to FIG. 1 of the types and formats of instructions sent by a CCC to IDs applies equally to the instructions that SDD 410 could send to IDs 220 through 232.

Figure 5:
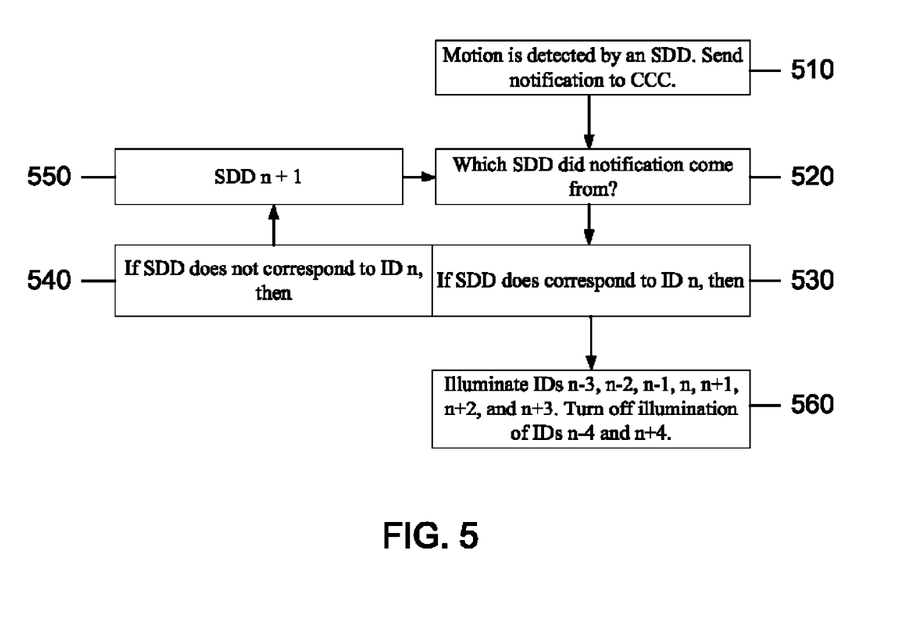
FIG. 5 is a flowchart showing the steps carried out by a system of the present invention including a CCC, for providing a decorative motion-tracking illumination pattern.

FIG. 5 is a flowchart showing the steps carried out by a system of the present invention including a CCC, for providing a decorative motion-tracking illumination pattern. In step 510, motion is detected by a motion-detecting SDD and the SDD detecting the motion sends a notification to a CCC indicating that motion is detected. In steps 520, 530, 540, and 550 the CCC determines which SDD detected the motion. See the description for FIG. 1 for an explanation of the various ways in which the CCC could make this determination. As shown here, the CCC cycles through the data structure in its memory for correlating IDs to SDDs until it finds the ID closest to the SDD that sensed the movement. This ID is "n". In step 560, the CCC then sends illumination commands to IDs n; n−1, n−2, and n−3, which are the three IDs immediately behind the moving object or person; and n+1, n+2, and n+3, which are the three IDs immediately in front of the moving object or person. The IDs immediately outside of this range are instructed to turn off. The overall effect of repeating this pattern each time motion is detected is that, in a corridor for instance, the IDs would appear to track the movement of at least one object or person walking or otherwise moving along the corridor. It is to be understood that any number of IDs in front of and behind the object or person could be illuminated, in this pattern. However, it is preferable that the number be limited to the range of three to five IDs in front and three to five IDs in the back, and most preferably, three IDs in the front and three in the back. It is also within the scope of this invention that ID "n" would instead be instructed to not illuminate, to signify the center of the range illuminated IDs.

Figure 6:
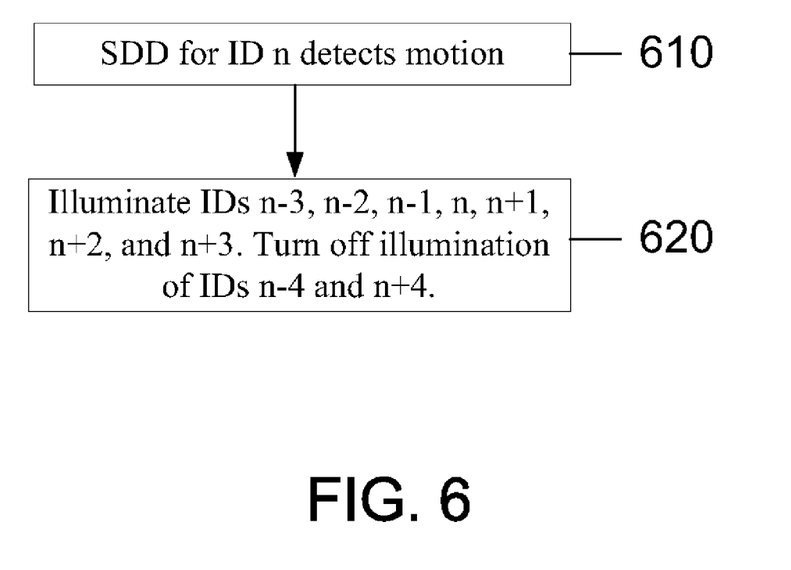
FIG. 6 is a flowchart showing the steps carried out by a system of the present invention where no CCC is present, for providing a decorative motion-tracking illumination pattern.

FIG. 6 is a flowchart showing the steps carried out by a system of the present invention where no CCC is present, for providing a decorative motion-tracking illumination pattern. In step 610, an SDD for detecting motion in fact detects motion. In step 620, the SDD instructs IDs n−3, n−2, n−1, n, n+1, n+2, and n+3 to illuminate and for IDs n−4 and n+4 to not illuminate. As with the embodiments discussed in reference to FIG. 5, the range of IDs illuminated in front of and behind the moving object or person can be any number, but it is preferable for the number to be three to five, and most preferably for it to be three. Again, ID "n" may instead be instructed to not illuminate, as discussed with reference to FIG. 5.

It is also preferable in the systems discussed with reference to FIGS. 5 and 6 that each ID have a corresponding SDD integrated with, housed in the same enclosure, or at least within close proximity (less than a foot) of it.

Figure 7A:
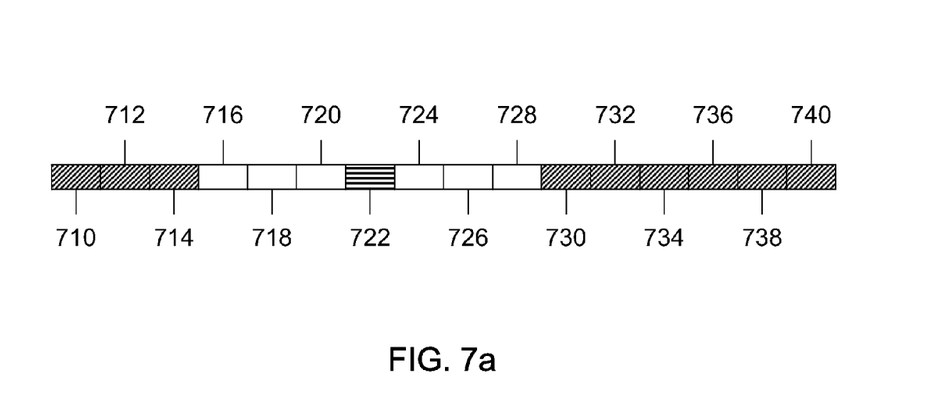
FIG. 7a is a schematic representation in which sixteen motion-detecting SDDs, each integrated with an ID, are mounted to a wall and are illuminated in accordance with the illumination pattern of FIGS. 5 and 6, at time "t".

FIG. 7a is a schematic representation in which sixteen motion-detecting SDDs, each integrated with an ID, are mounted to a wall and are illuminated in accordance with the illumination pattern of FIGS. 5 and 6, at time "t". Each integrated SDD and ID is housed within a "tile" enclosure, items 710 through 740, having a transparent or translucent cover. In this figure, a person (not shown) is walking from left to right, and is presently directly in front of tile 722. As discussed with reference to FIGS. 5 and 6, ID "n" which is the ID closest to the moving person, could be specifically instructed to illuminate or not, depending on the particular embodiment. For illustrative purposes, tile 722 is shown with horizontal lines to indicate that this is where the person is currently located. Tiles 716, 718, 720, which correspond to IDs n−3, n−2, and n−1, as well as tiles 724, 726, and 728 which correspond to IDs n+1, n+2, and n+3, are lit up. The tiles outside of this range, 710 through 714 and 730 through 740, are not illuminated and thus are shown with diagonal lines to indicate this status.

Figure 7B:
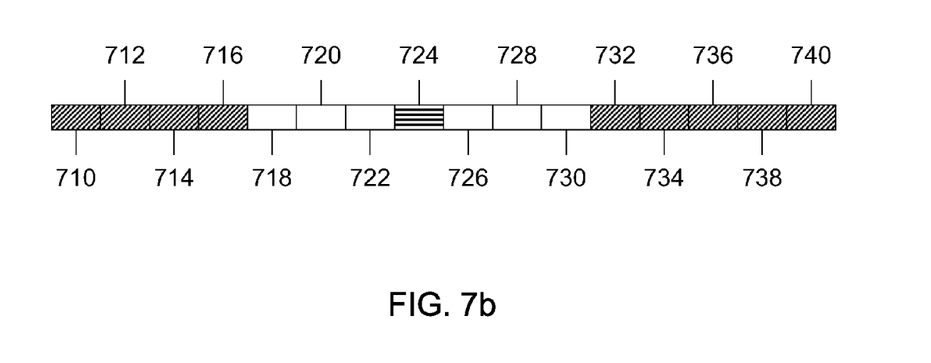
FIG. 7b is a schematic representation in which sixteen motion-detecting SDDs, each integrated with an ID, are mounted to a wall and are illuminated in accordance with the illumination pattern of FIGS. 5 and 6, at time "t+1".

FIG. 7b is a schematic representation in which sixteen motion-detecting SDDs, each integrated with an ID, are mounted to a wall and are illuminated in accordance with the illumination pattern of FIGS. 5 and 6, at time "t+1". At the point in time shown in this figure, the person (again, not shown) has continued to move to the right and is now in front of tile 724. Thus, tile 724 is shown with horizontal lines to indicate the position of the person. Tiles 718, 720, 722, 726, 728 and 730 are illuminated, and the tiles further away on either side, 710 through 716 and 732 through 740, are shown with diagonal lines to indicate that they are not illuminated.

The above-described embodiments are intended to illustrate the principles of the invention, but not to limit its scope. Other embodiments and variations will be apparent to those skilled in the art and may be made without departing from the spirit and scope of the invention.

We claim:
1. A progressive, directing lighting system comprising:
a plurality of sensing or detecting devices each comprising at least one sensor for detecting a change in environmental conditions selected from the group consisting of movement of at least one object or person, a change in temperature, a change in pressure, a presence of smoke above a predefined concentration, and a presence of toxic gas above a predefined concentration;
a plurality of illuminating devices comprising a tile with a transparent or translucent surface and at least one light source located substantially parallel to an edge of a light-guiding substrate located behind the surface;

wherein the illuminating devices are illuminated according to environmental conditions detected by the sensing or detecting devices;

wherein the sensing or detecting devices and the illuminating devices are directly connected or are connected to the same wired or wireless network; and wherein the sensing or detecting device contains either hardwired logic or a processing unit and a memory with processor executable instructions for detecting a change in environmental conditions selected from the group consisting of movement of at least one object or person, a change in temperature, a change in pressure, a presence of smoke above a predefined concentration, and a presence of toxic gas above a predefined concentration; and in response to detecting the change in environmental conditions, instructing the plurality of illuminating devices to illuminate in a sequence that both illuminates the perimeter of a structure having an exit and indicates the location of the exit.

2. The progressive, directing lighting system of claim 1, wherein the illuminating devices are located in the floor of the structure.

3. The progressive, directing lighting system of claim 1, wherein at least one sensing or detecting device is located behind the translucent or transparent surface of the tile of an illuminating device.

4. The progressive, directing lighting system of claim 1, wherein the illuminating devices and sensing or detecting devices are powered by alternating current.

5. The progressive, directing lighting system of claim 1, wherein the illuminating devices and sensing or detecting devices are powered by direct current.

6. The progressive, directing lighting system of claim 1, wherein the illuminating devices are capable of displaying a plurality of colors of light.

7. A progressive, directing lighting system comprising:
a plurality of sensing or detecting devices each comprising at least one sensor for detecting a change in environmental conditions selected from the group consisting of movement of at least one object or person, a change in temperature, a change in pressure, a presence of smoke above a predefined concentration, and a presence of toxic gas above a predefined concentration;
a plurality of illuminating devices comprising a tile with a transparent or translucent surface and at least one light source located substantially parallel to an edge of a light-guiding substrate located behind the surface;
a command and control center comprising either a) a general purpose computer, having a central processing unit and a memory, connected to an auxiliary board adapted to interface with the sensing or detecting devices and the illuminating devices or b) an FPGA or microcontroller having, integrated with, or connected to hardware adapted to interface with the sensing or detecting devices and the illuminating devices;
wherein the command and control center is programmed to analyze notifications relating to changes in environmental conditions received from sensing or detecting devices and to issue instructions to sensing or detecting devices and illuminating devices in response to the received notifications;
wherein the sensing or detecting devices, illuminating devices, and command and control center are directly connected or are connected to the same wired or wireless network;
wherein the command and control center is programmed for
receiving a notification from a sensing or detecting device indicating a change in environmental conditions selected from the group consisting of movement of at least one object or person, a change in temperature, a change in pressure, a presence of smoke above a predefined concentration, and a presence of toxic gas above a predefined concentration; and
in response to the notification of a detected change in environmental conditions, instructing the plurality of illuminating devices to illuminate in a sequence that both illuminates the perimeter of a structure having an exit and indicates the location of the exit.

8. The progressive, directing lighting system of claim 7, wherein the command and control center is a general purpose computer, having a central processing unit and a memory, connected to an auxiliary board adapted to interface with the sensing or detecting devices and the illuminating devices, and contains within the memory processor-executable instructions for:
receiving an electronic notification from a sensing or detecting device that motion is detected in a room of a structure; and
sending a notification of the movement to a display screen that is either directly connected to the command and control center or that is in communication with the command and control center through another computer on a wired or wireless network.

9. The progressive, directing lighting system of claim 7, wherein the command and control center is a general purpose computer, having a central processing unit and a memory, connected to an auxiliary board adapted to interface with the sensing or detecting devices and the illuminating devices, and contains within the memory a map of the structure in which the sensing or detecting devices and the illuminating devices are located.

10. The progressive, directing lighting system of claim 7, wherein the command and control center, illuminating devices, and sensing or detecting devices are powered by alternating current.

11. The progressive, directing lighting system of claim 7, wherein the command and control center, illuminating devices, and sensing or detecting devices are powered by direct current.

12. The progressive, directing lighting system of claim 7, wherein the illuminating devices are capable of displaying a plurality of colors of light.

13. A method of providing progressive, directing lighting for a structure comprising:
receiving a notification of a change in environmental conditions within the structure detected by at least one sensor in a sensing or detecting device for detecting a change in environmental conditions selected from the group consisting of movement of at least one object or person, a change in temperature, a change in pressure, presence of smoke above a predefined concentration, and a presence of toxic gas above a predefined concentration;
sending electronic instructions to a plurality of illuminating devices mounted along the perimeter of a structure to illuminate in a sequence that both illuminates the perimeter of the structure and indicates the location of an exit of the structure, wherein the sequence begins with illuminating the illuminating device furthest from the exit and progresses to the illuminating device closest to the exit.

14. The method of claim 13 of providing progressive, directing lighting for a structure, wherein a change in environmental conditions within the structure is one selected from the group consisting an increase in temperature to above 120 degrees Fahrenheit, a sudden change in pressure, a presence of smoke above a predefined concentration above a predefined concentration, and a presence of toxic gas above a predefined concentration.

15. The method of claim 13 of providing progressive, directing lighting for a structure, further comprising:
sending electronic instructions to at least one sensing or detecting devices to deactivate motion-sensing functionality;
sending electronic instructions to at least one illuminating devices to not illuminate in colors that are not associated with an emergency; and
sending electronic instructions to at least one illuminating device to illuminate in red.

16. The method of claim 13 of providing progressive, directing lighting for a structure, wherein the sequence includes sending electronic instructions to all of the illuminating devices illuminated as a result of the sequence to no longer illuminate after a predetermined period of time has elapsed.

17. The method of claim 16 of providing progressive, directing lighting for a structure, wherein the sequence in the method above repeats from the beginning after a predefined period of time has elapsed.

18. A method of providing a decorative illumination along a surface of a structure comprising:
a) receiving a notification of movement of at least one object or person within the structure, detected by at least one motion sensor in a sensing or detecting device;
b) sending electronic instructions to a plurality of illuminating devices mounted in an array along at least a portion of the surface of the structure to illuminate or not in a sequence that tracks the movement of the at least one object or person, wherein the sequence comprises:
b1) instructing three to five consecutive illuminating devices immediately in front the illuminating device closest to the at least one object or person to illuminate;
b2) simultaneously instructing three to five consecutive illuminating devices immediately behind the illuminating device closest to the at least one object or person to illuminate; and
b3) simultaneously instructing illuminating devices further in front of and behind the illuminating device closest to the at least one object or person to not illuminate; and
c) repeating steps a and b.

19. The method of claim 18 of providing a decorative illumination along a surface of a structure, further comprising in step b), the step of simultaneously instructing the illuminating device closest to the at least one object or person to illuminate.

20. The method of claim 18 of providing a decorative illumination along a surface of a structure, further comprising in step b) the step of simultaneously instructing the illuminating device closest to the at least one object or person to not illuminate.

21. The method of claim 18 of providing a decorative illumination along a surface of a structure, wherein steps b1) and b2) are:
b1) instructing three consecutive illuminating devices immediately in front the illuminating device closest to the at least one object or person to illuminate;
b2) simultaneously instructing three consecutive illuminating devices immediately behind the illuminating device closest to the at least one object or person to illuminate.

* * * * *